Patented Apr. 25, 1950

2,505,247

UNITED STATES PATENT OFFICE 2,505,247

PROCESS FOR THE PREPARATION OF IMIDAZOLINES

Hans Isler, Bottmingen, Switzerland, assignor to Ciba Pharmaceutical Products, Inc.

No Drawing. Application May 21, 1946, Serial No. 671,407. In Switzerland June 6, 1945

6 Claims. (Cl. 260—309.6)

The present invention relates to a process for the preparation of imidazolines.

Imidazolines have heretofore been prepared by the conversion of a nitrile, by means of hydrogen sulfide, into the corresponding thioamide, followed by reaction of the latter with ethylene diamine; see Forsell, Ber., vol. 25, page 2132 (1892). In this process, however, the preparation of the thioamide is troublesome and time-consuming; see Gabriel and Heymann, Ber., vol. 23, page 158 (1890) and K. Kindler, Annalen der Chemie, vol. 431, page 187 (1923).

A primary object of the present invention is the embodiment of a process for the preparation of imidazolines by the direct conversion thereinto of the initial nitriles, that is, without the necessity of intermediately preparing the thioamides, whereby the aforesaid deficiency of the prior art procedure is obviated.

It has now been found that the aforesaid object may be realized, that is, imidazolines may be directly produced, by reacting the corresponding nitriles with a 1,2-diamine in the presence of hydrogen sulfide.

The hydrogen sulfide may be added as such, or may be formed during the course of the reaction from hydrogen sulfide-yielding materials such as carbon disulfide, phosphorus pentasulfide, alkali metal sulfides, ammonium sulfides, iron sulfide or aluminum sulfide, if necessary in the presence of small amounts of water.

The initial nitrile may be an aliphatic nitrile such as acetic acid nitrile, butyric acid nitrile or capronic acid nitrile, an alicyclic nitrile such as cyclohexyl acetic acid nitrile, or cyclohexenyl acetic acid nitrile, an aromatic nitrile such as benzonitrile or naphthoic acid nitrile, an araliphatic nitrile such as phenyl acetic acid nitrile, naphthyl-(1)-acetic acid nitrile or β-phenylpropionic acid nitrile, or a heterocyclic nitrile such as nicotinic acid nitrile, indole-(3)-acetic acid nitrile or quinoline-8-acetic acid nitrile. In addition, the starting nitrile may contain substituents such as halogen atoms, and substituted or unsubstituted hydroxy or amino groups. Illustrative of these nitriles are 2-hydroxybenzonitrile, 3,4,5-trimethoxyphenyl acetic acid nitrile, 2-methoxynaphthyl acetic acid nitrile, 4-methoxynaphthyl-(1)-acetic acid nitrile, 4-aminophenyl acetic acid nitrile, N-phenyl-aminoacetic acid nitrile or 4-chloro-benzo-nitrile.

Illustrative of the 1,2-diamines which may be employed in the present invention are ethylene diamine, N-methyl-ethylenediamine, N-ethyl-ethylene diamine, N-propyl-ethylenediamine, 1-methyl-ethylenediamine, 1,2-dimethyl-ethylene-diamine or 1-phenyl-ethylenediamine.

The conversion is preferably carried out in an organic solvent such as ethanol, toluene, xylene and the like at elevated temperature and in a closed vessel. However, when use is made, for example, of a hydrogen sulfide-yielding material such as phosphorus pentasulfide or alkali metal sulfides (sodium sulfide or the like), it is also possible to carry out the reaction under reflux in a solvent such as xylene. In many cases, it is helpful to add a mineral acid such as a hydrohalogen acid (hydrochloric acid), sulfuric acid or phosphoric acid.

In contrast to the hereinbefore described method of the prior art, the present invention, in which the initial nitrile is directly converted into the imidazoline, has the advantage of being more practical, simpler to carry out and of giving the same or even better yields. A further advantageous and particularly surprising feature of the invention is the substantially smaller quantity of hydrogen sulfide required than would be necessary for the formation of the corresponding thioamide.

The products obtained according to the invention are useful as therapeutic agents or as intermediates.

The invention is illustrated by the following examples wherein "parts by weight" bear the same relation to "parts by volume" as do grams to cubic centimeters.

Example 1

While cooling with ice, 80 parts by weight of gaseous hydrogen chloride and then hydrogen sulfide up to the saturation point are introduced into 234 parts by weight of phenylacetonitrile, 139 parts by weight of ethylene diamine (95%), and 1400 parts by volume of absolute ethanol. The mixture is heated several hours in an autoclave at 50–55° C. and then for a short time at 90–95° C. After cooling, the alcohol is distilled off, dilute hydrochloric acid added to the residue, the solution filtered and evaporated to dryness. The residue is treated with absolute ethanol, filtered, concentrated, and 2-benzyl-imidazoline hydrochloride of melting point 171–172° C. isolated from the solution by the addition of ethyl acetate.

Example 2

A solution of 167 parts by weight of naphthyl-(1)-acetonitrile and 70 parts by weight of ethylene diamine (95%) in 700 parts by volume of absolute ethanol is saturated with hydrogen sulfide and heated in an autoclave for some time at 90–95° C. The reaction mixture is worked up as in Example 1 and 2-[naphthyl-(1)-methyl]-imidazoline hydrochloride of melting point 249–251° C. is obtained.

Example 3

A mixture of 206 parts by weight of benzonitrile, 139 parts by weight of ethylene diamine (95%), and 1400 parts by volume of absolute ethanol are cooled. 80 parts by weight of gaseous hydrogen chloride are introduced, then hydrogen sulfide to saturation, and then the mixture heated in an autoclave. After cooling, the ethanol is distilled off, the residue treated with sodium hydroxide solution, extracted with benzene, the extract dried, the benzene removed and the resulting residue distilled in vacuo. 2-phenyl-imidazoline of melting point 101–102° C. is thus obtained.

Instead of adding hydrogen sulfide to the solution of benzonitrile and ethylene diamine, the benzonitrile can also be reacted with hydrogen sulfide salt of ethylene diamine.

Example 4

23.4 parts by weight of phenylacetonitrile, 13.9 parts by weight of ethylene diamine (95%), 140 parts by volume of absolute ethanol and 1 part by weight of hydrogen sulfide are heated for six hours to 90–100° C. in an autoclave equipped with a stirrer. After cooling, the ethanol is distilled off, the residue taken up in dilute hydrochloric acid and from that point on treated according to Example 1. 31 parts by weight of 2-benzyl-imidazoline hydrochloride of the same melting point as in Example 1, are thus obtained.

Carbon disulfide, as a hydrogen sulfide-yielding material, can be used equally as well instead of the hydrogen sulfide.

Instead of ethanol, toluene may also be used as a diluent.

Example 5

A mixture of 23.4 parts by weight of phenylacetonitrile, 160 parts by volume of absolute ethanol, 1 part by weight of magnesium oxide, 1.3 parts by weight of crystallized sodium sulfate, 1.8 parts by weight of phosphorus pentasulfide and 13.9 parts by weight of ethylene diamine (95%) is heated in a bomb tube for 12 hours at 90–100° C. After cooling, the ethanol is distilled off. The residue is taken up in dilute hydrochloric acid and further treated as in Example 1.

It is advantageous to use toluene or xylene instead of ethanol in this method of working.

Example 6

A mixture of 33.4 parts by weight of naphthyl-(1)-acetonitrile, 140 parts by volume of absolute ethanol, 1 part by weight of carbon disulfide and 15.2 parts by weight of ethylene diamine (95%) is heated in a rotating steel tube for 15 hours to 90–100° C. The ethanol is then distilled off, the residue taken up in 180 parts by volume of N-hydrochloric acid, stirred up with animal charcoal, filtered and evaporated to dryness. The residue is crystallized from absolute ethanol. 38 parts by weight of 2-[naphthyl-(1)-methyl]-imidazoline hydrochloride of melting point 249–251° C. are obtained.

Example 7

A mixture of 39.4 parts by weight of 4-methoxy-naphthyl-(1)-acetonitrile, 13.9 parts by weight of ethylene diamine (95%), 2 parts by weight of aluminum sulfide, 1.3 parts by weight of crystallized sodium sulfate and 140 parts by volume of absolute ethanol is heated in an autoclave equipped with a stirrer to 90–100° C. for 12 hours. After cooling, the ethanol is distilled off, the residue treated with dilute hydrochloric acid, the solution filtered and evaporated. The residue is taken up again in absolute ethanol, filtered free of a small quantity of undissolved ethylene diamine dihydrochloride as well as of inorganic salts, then the ethanol is distilled off and the residue which remains is crystallized from butanol. 2-[4'-methoxy-naphthyl-(1')-methyl]-imidazoline hydrochloride of melting point 218–219° C. is thus obtained.

Instead of aluminum sulfide, iron sulfide can be used equally as well.

Example 8

23.4 parts of phenylacetic acid nitrile, 15.2 parts of ethylene diamine (95%), 160 parts by volume of xylene, 2.5 parts of magnesium oxide, 3.3 parts of sodium sulfate, containing crystal water, and 4.5 parts of phosphorus pentasulphide are heated for 12 hours on the boiling water bath in a stirring vessel fitted with a reflux cooler. The whole is then suction-filtered and the xylene is removed from the filtrate by distillation under 12 m.m. pressure. The residue is taken up in dilute hydrochloric acid and worked up as described in Example 1.

Example 9

33.4 parts of naphthyl-(1)-acetic acid nitrile, 12.7 parts of ethylene diamine (95%), 160 parts by volume of toluene and 5.4 parts of ethylene diamine dihydrochloride are heated for 6 hours on the boiling water bath in a stirring vessel fitted with a reflux cooler. In the course of heating 3.2 parts of dehydrated sodium sulfide are introduced in portions. The whole is filtered while hot, the filtrate is freed from toluene by distillation and the residue is distilled in a high vacuum. 2-[naphthyl-(1)-methyl]-imidazoline of boiling point 178–179° C. under 0.1 mm. pressure and of melting point 118–120° C. is thus obtained.

The toluene residue may also be converted directly into the 2-[naphthyl-(1)-methyl]-imidazoline hydrochloride of melting point 249–251° C. according to the method of working up described in Example 6.

In the manner analogous to the above examples, other imidazolines can be prepared, as for example the following:

2-n-pentyl-imidazoline; boiling point $_{12}$ 126–128° C.;
2-cyclohexylmethyl-imidazoline; melting point 110–111° C.; boiling point $_{11}$ 156–158° C.;
2-(β-phenyl-ethyl)-imidazoline; melting point 103–104° C.;
2-(3',4',5'-trimethoxybenzyl)-imidazoline hydrochloride; melting point 185–186° C.;
2-[2'-methoxy-naphthyl-(1')]-imidazoline hydrochloride; melting point 263–264° C.;
2-[pyridyl-(3')]-imidazoline; melting point 104–105° C.;
2-[quinolyl-(8')-methyl]-imidazoline; melting point 93–95° C.; boiling point $_{0.05}$ 190–192° C.;
2-(N-phenyl-aminomethyl)-imidazoline hydrochloride; melting point 180–182° C.;
2 - (cyclohexenylmethyl) - imidazoline; boiling point $_{0.1}$ 103–106° C.;
2-(4'-amino-benzyl)-imidazoline; melting point 121–122.5° C.;

2 - (2' - hydroxy - phenyl) - imidazoline; melting point 209° C.;
2-[indolyl - (3') - methyl] - imidazoline; melting point 131-133° C.; and
2-methyl-4-phenyl-imidazoline; boiling point 0.2 121-122° C.

Having thus disclosed the invention, what is claimed is:

1. A process for the preparation of an imidazoline, which comprises reacting a nitrile with an ethylene diamine in the presence of a catalytic quantity of hydrogen sulfide, whereby substantially less sulfur is present than is stoichiometrically required for the formation of the corresponding thioamide.

2. A process for the preparation of an imidazoline, which comprises reacting an acetonitrile with ethylene diamine while introducing a catalytic quantity of gaseous hydrogen sulfide, whereby substantially less sulfur is present than is stoichiometrically required for the formation of the corresponding thioamide.

3. A process for the preparation of an imidazoline, which comprises reacting an acetonitrile with ethylene diamine in the presence of a catalytic quantity of hydrogen sulfide-yielding material, whereby substantially less sulfur is present than is stoichiometrically required for the formation of the corresponding thioamide.

4. A process for the preparation of 2-benzyl-imidazoline, which comprises reacting phenyl-acetonitrile with ethylene diamine in the presence of a catalytic quantity of hydrogen sulfide, whereby substantially less sulfur is present than is stoichiometrically required for the formation of the corresponding thioamide.

5. A process for the preparation of 2-[naphthyl-(1)-methyl]-imidazoline, which comprises reacting naphthyl-(1)-acetonitrile with ethylene diamine in the presence of a catalytic quantity of hydrogen sulfide, whereby substantially less sulfur is present than is stoichiometrically required for the formation of the corresponding thioamide.

6. A process for the preparation of 2-[4'-methoxy-naphthyl-(1')-methyl]-imidazoline, which comprises reacting 4-methoxy-naphthyl-(1)-acetonitrile with an ethylene diamine in the presence of a catalytic quantity of hydrogen sulfide, whereby substantially less sulfur is present than is stoichiometrically required for the formation of the corresponding thioamide.

HANS ISLER.

REFERENCES CITED

The following references are of record in the file of this patent:

UNITED STATES PATENTS

| Number | Name | Date |
|---|---|---|
| 2,201,171 | Hanford | May 21, 1940 |

OTHER REFERENCES

Berichte, vol. 25, pp. 2134-2135 (1892).
Beilstein, vol. 9, p. 277, citing Cahours, Comptes rendus, vol. 27, p. 239.